(12) United States Patent
Webb (10) Patent No.: US 11,698,609 B2
(45) Date of Patent: Jul. 11, 2023

(54) CASCADED MODEL PREDICTIVE CONTROL WITH ABSTRACTING CONSTRAINT BOUNDARIES

(71) Applicant: HONEYWELL INTERNATIONAL INC., Morris Plains, NJ (US)

(72) Inventor: Christopher J. Webb, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/796,276

(22) Filed: Feb. 20, 2020

(65) Prior Publication Data

US 2021/0263485 A1 Aug. 26, 2021

(51) Int. Cl.
G05B 13/04 (2006.01)

(52) U.S. Cl.
CPC ......... G05B 13/041 (2013.01); G05B 13/042 (2013.01); G05B 13/048 (2013.01)

(58) Field of Classification Search
CPC .. G05B 13/041; G05B 13/048; G05B 13/042; G05B 13/04
USPC ......................................................... 700/29
See application file for complete search history.

(56) References Cited

U.S. PATENT DOCUMENTS

| | | | |
|---|---|---|---|
| 10,379,503 B2 | 8/2019 | Lu | |
| 10,466,684 B2 | 11/2019 | Lu | |
| 2009/0319070 A1* | 12/2009 | Morningred | G06Q 10/06 700/103 |
| 2011/0040399 A1* | 2/2011 | Lu | G05B 13/024 700/102 |
| 2016/0018796 A1* | 1/2016 | Lu | G05B 13/048 700/29 |
| 2016/0018797 A1* | 1/2016 | Lu | H04L 67/12 700/3 |
| 2018/0341252 A1* | 11/2018 | Lu | G05B 19/41805 |
| 2019/0079466 A1* | 3/2019 | Lim | G01W 1/10 |
| 2019/0179271 A1* | 6/2019 | Modi | G05B 13/048 |
| 2019/0326755 A1* | 10/2019 | Fu | H02J 3/18 |

* cited by examiner

*Primary Examiner* — Kenneth M Lo
*Assistant Examiner* — Mohammed Shafayet
(74) *Attorney, Agent, or Firm* — Bookoff McAndrews, PLLC (57) ABSTRACT

A cascaded MPC system includes an upper tier controller and lower tier controller having stored constraints for controlling a process having manipulated variables (MVs), controlled variables (CVs), and conjoint manipulated variable (CMV). The upper tier passes a target value for the CMV to the lower tier which optimizes for determining a local optimal operating point for the MVs, CVs, and CMV, moves towards the target value starting at the CMVs local operating point, and optimizes for identifying of the constraints as selected constraint(s) when the moving is truncated, passes the selected constraint(s) to the upper tier which performs an overall optimization for the process using the selected constraint to generate an optimal value for the CMV that lower tier uses as a new CM V target value for redetermining updated local optimal operating points for the MVs, CVs, and CMV, and for controlling the process utilizing the updated operating points.

19 Claims, 5 Drawing Sheets

CASCADED MODEL PREDICTIVE CONTROL WITH ABSTRACTING CONSTRAINT BOUNDARIES

FIELD

Disclosed embodiments relate to industrial process control and automation systems, and more particularly to cascaded multi-variable model predictive control (MPC) of industrial process control and automation systems.

BACKGROUND

Multi-tier or multi-scale optimization is an important tool for the global optimization of a complex system, such as an integrated oil processing or chemical plant, which is one example of an industrial process control and automation system. A lower tier (fine scale) controller, such as process unit controller, generally found at level 3 in the Purdue model, is coupled to an upper tier controller, such as production coordination controller, generally found at level 4 of the Purdue model. In the case the lower tier controller is at level 3, the upper tier controller runs at a level considered to be "3.5" of the Purdue model giving the upper tier controller access to both level 3 and level 4 networks. There is also generally machine controller(s), generally being distributed control system (DCS) controllers in Level 2 in the Purdue model, and lowest level controller(s) are directly coupled the sensors in the actuators in Level 0 in the Purdue model, the Level 2 controller such as the DCS controller can directly interact with actuators/sensors or with the smart device.

A 'process unit' means the equipment assembled and connected by pipes and ducts to process raw materials and to manufacture either a final or intermediate product used in the onsite production of other products. The term process unit also includes the purification of recovered byproducts. In an industrial plant, there are generally a plurality of process units.

The dynamic models used by the lower tier model-based process controller may be based on physio-chemical relationships, but are often black box models relating changes in the operating handles (the independent, manipulated or manipulated variables, MVs) to changes in the key operating parameters (dependent, responding or controlled variables, CVs). These MPC models allow the process controller(s) to maintain the operations within bounds while simultaneously moving the process units to the optimal operating point.

While the conventional process unit control works well locally, process unit control generally misses the interactions between respective process units. Consequently, it is possible to optimize each of the individual process units, but this arrangement will likely miss the overall optimization of the industrial plant. This coordination of process units is the responsibility of the upper tier process controller with which the lower tier controller(s) communicate. The MPC model used in the upper tier (coarse scale) controller does not require the level of detail found in the low-level MPC model used by the lower tier controller(s). Rather, the upper tier MPC model merely needs to accurately capture the relationships between the individual process units.

Several approaches are known for implementing the upper tier control and optimization. With one known approach which may be referred to as a "super-model," a copy of the complete model for each process unit is reproduced and stored in a memory associated with the upper tier controller. Secondary relationships, describing the interactions between the respective models, are added to this super-model. Ultimately, this super-model is optimized to achieve the global optimization of the process control and automation system. This super-model approach is used by the PROFIT OPTIMIZER marketed by Honeywell International, which is the Applicant and assignee for this application.

This Disclosure recognizes because this super-model approach does not abstract any of the constraints found in the lower tier models, and the size of the upper tier model grows very quickly. In this super-model approach, the model relationship includes relationships between all the variables associated with all the lower tier controllers and all the constraints limiting the available operating space for these variables. Because one does not differentiate between variables (and thus includes all the variables in the process unit models), this makes the super-model (i.e. the coarse model) approach very large. Ultimately, the upper tier model can become too unwieldly to solve in real-time, constraining the practical size of the upper tier model. This super-model approach is not a multi-scale approach as the upper tier controller subsumes all the constraints of the lower tier controllers.

A true multi-scale optimization has different sets of constraints/variables depending on the "resolution" of the scale. So, at the coarse level (upper tier), optimizing overall production of the plant or site is taking place, but with looking at and optimizing a few key operating parameters associated with each process unit. This view looks at the operation of the whole plant. As one "increases the resolution of the scale," one takes the solution from the upper tier model and sees how that interacts with the optimization occurring at the lower tier model. If the upper tier model solution works at the lower tier model (that is the solution is "feasible") then overall production has been optimized. If not, then the lower tier model is optimized and the result of this optimization updates the operating bounds associated with the key operating variables. These updated bounds are then passed back to the upper tier controller.

A second optimization approach, found in PROFIT EXECUTIVE also marketed by Honeywell International, projects the constraints found in the lower tier controller MPC models on the operating range of the upper tier controller. The upper tier controller needs to only model the relationship between process units and their interconnecting, upper tier controller operating handles. The operating constraints imposed by individual process units limit the range of the upper tier controller operating handles. In the PROFIT EXECUTIVE, these constraints are referred to as proxy limits and the shared operating handles as conjoint variables.

The conjoint variables are utilized by the upper tier (production coordination; level 4) controller to optimize overall plant operation, but are also used by the individual lower tier (process unit controllers, level 3) to control operation of the plant. As an example, unit throughput (feed flowrate going to the process unit) can be an important handle for controlling the operation of the process unit. Throughput must be maintained between strict limits to avoid equipment failures, column flooding, etc. The same unit throughput is important at the upper tier controller to determine how to optimally route material flows between process units. In the upper tier controller, changing the material routing has a significant impact on the volumes of products produced. However, there are minimum and maximum limits associated with the flow imposed by the operation constraints in the process unit.

To determine the proxy limits for an individual process unit, the PROFIT EXECUTIVE employs a series of optimizations to find the largest feasible operating space for the individual process units. At the process unit level, generally level 3, the operating handles are classified as either being conjoint (shared with the upper tier) or non-conjoint (not shared) variables. During each of the optimizations, a single conjoint variable is maximized or minimized while keeping the remaining conjoint variables constant. This optimization is then repeated for other conjoint variables. The result is a series of bounds defining the boundary between feasible and infeasible system operation.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects relate to cascaded multi-variable MPC of industrial process control and automation systems. Cascaded control is known to be a control algorithm in which the output of one controller provides target(s) to another controller.

Disclosed aspects include a new cascaded MPC approach describing how to constrain conjoint measured variables (CMVs) that are variables which are shared between the upper tier controller and lower tier controller(s) of a multi-tier control system. The term 'abstraction' means disclosed aspects are 'abstracting' the fundamental limitations of the process unit on to a small set of CMVs.

A disclosed method for control system for implementing cascaded MPC comprises providing an upper tier controller and at least one lower tier controller having a plurality of stored numerical operating constraints (constraints) that define an operating space for controlling a process having defined variables including manipulated variables (MVs), controlled variables (CVs), and at least one conjoint manipulated variable (CMV). The upper tier controller passes a target value for the CMV to the lower tier controller when the lower tier controller is running at a current operating point for ones of the MVs, the CVs, and the CMV. As used herein, a "target value" means a set of numbers indicating a location in a multi-dimensional space, being a two-dimensional (2D) space as shown in the FIGs when a target value is shown.

The lower tier controller is for moving the CMV towards the target value for CMV starting at the current operating point for the CMV. Optionally, before the moving the lower tier controller determining values by optimizing an objective function to define a local optimal operating point for the MVs, the CVs, and the CMV, wherein the moving instead of starting at the current operating point for the CMV can comprise starting at the local optimum operating point for the CMV.

The lower tier controller is for optimizing for identifying at least a selected one of the constraints (selected numerical constraint) corresponding to the moving when moving is truncated before reaching the target value for the CMV. The lower tier controller passes the selected numerical constraint to the upper tier controller. The upper tier controller performs an overall business (e.g., economic) objective optimization for the process using the selected numerical constraint to limit a range over which the upper tier controller optimizes to generate an optimal value for the CMV. The upper tier controller passes the optimal value to the lower tier controller as a new target value for the CMV. The lower tier controller uses the new target value for the CMV for redetermining values that define updated operating points for ones of the MVs, and CVs (and optionally for the CMV). The lower tier controller controls the process utilizing the updated operating points.

BRIEF DESCRIPTION OF THE DRAWINGS

FIG. 2 illustrate an example cascaded MPC system for an industrial process control and automation system that disclosed aspects can be practiced on.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

As used herein a plant or an industrial process facility runs an industrial process involving a tangible material that disclosed embodiments apply. For example, oil and gas, chemical, beverage, pharmaceutical, pulp and paper manufacturing, petroleum processes, electrical, and water. A plant or an industrial process facility is distinct from a data processing system that only performs data manipulations.

Figure 1:
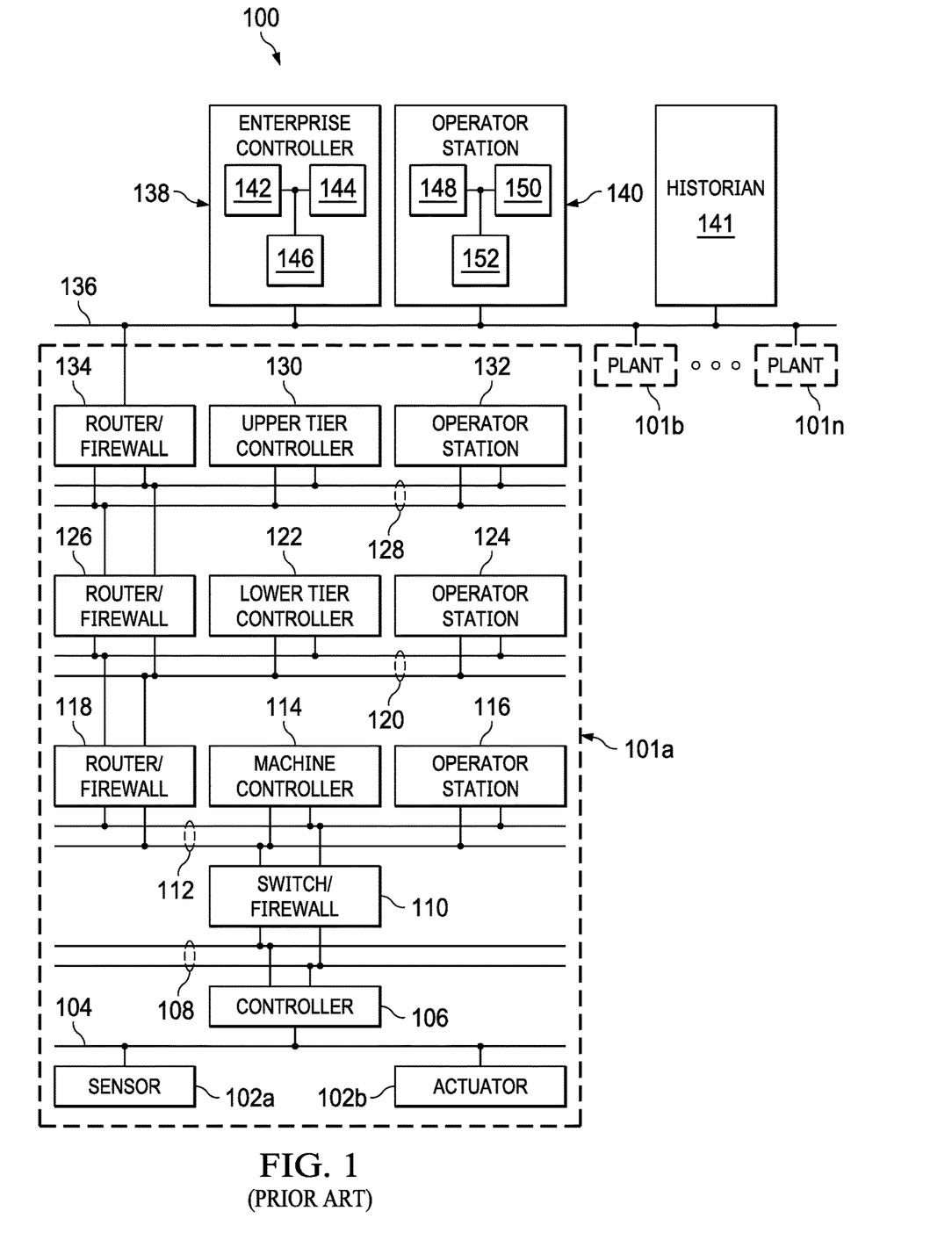
FIG. 1 illustrates an example of a known industrial process control and automation system that can benefit from disclosed aspects.

FIG. 1 illustrates an example industrial process control and automation system (process system) 100 that includes a disclosed control system for controlling the process, according to this Disclosure. As shown in FIG. 1, the process system 100 includes various components that facilitate production or processing of at least one product or other material. For instance, the process system 100 is used here to facilitate control over components in one or multiple plants 101a-101n. Each plant 101a-101n represents one or more processing facilities (or one or more portions thereof), such as one or more manufacturing facilities for producing at least one tangible product or other material. In general, each plant 101a-101n may implement one or more processes and can individually or collectively be referred to herein as a process system. A process system generally represents any system or portion thereof configured to process one or more products or other materials in some manner.

In FIG. 1, the process system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or a FOUNDATION FIELDBUS network), a pneumatic control signal network, or any other or additional type(s) of network(s).

In the Purdue model, there are levels 0 to 5 that each generally include a controller, where the controllers collectively implement a control system for controlling the process. Level 0 includes sensors and actuators and the processing equipment, level 1 is generally the "smart" transmitters, actuators, or controllers that are locally contained and communicate via HART or FIELDBUS, level 2 is generally the DCS controller that interacts with level 0 and level 2 to control simple loop (i.e. a temperature control loop). Level 2 has a firewall to level 3 but typically not level 1 or 0, level 3 is the advanced control layer and includes the lower tier controllers that comprise MPC controllers that have a firewall to level 4. Level 4 is the business layer and includes data gathering for production account and manufacturing execution system and can include the upper tier controller. As noted above, in the case the lower tier controller is that level 3, the upper tier runs at "3.5" giving it some access to both level 3 and level 4 networks. Level 5 is the enterprise layer and may include production from multiple plants.

Level 1 may include one or more controllers 106 as a smart device, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 is shown that optionally couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 can represent any of variety of suitable networks, such as a fault tolerant ethernet (FTE) network.

In the Purdue model, "Level 2" may include one or more machine-level controllers 114 such as DCS controllers, coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the process system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/ firewall. The networks 120 can represent any suitable communication network, such as an FTE network.

In the Purdue model, "Level 3" may include one or more lower tier controllers 122 (may also be referred to as unit-level controllers) coupled to the networks 120. Each lower tier controller 122 is typically associated with a process unit in a process system, which represents a collection of different machines operating together to implement at least part of a process. The lower tier controllers 122 perform various functions to support the operation and control of components in the lower levels. For example, the lower tier controllers 122 could log information collected or generated by the components in the lower levels, execute applications that control the components in the lower levels, and provide secure access to the components in the lower levels. Each of the lower tier controllers 122 includes any suitable structure for providing access to, control of, or operations related to one or more machines or other pieces of equipment in a process unit.

Each of the lower tier controllers 122 could, for example, represent a server computing device running a MICROSOFT WINDOWS operating system. Each controller 122 could, for example, represent a multivariable controller, such as the PROFIT CONTROLLER from Honeywell International, or other type of controller implementing MPC or other advanced predictive control (APC). Although not shown, different lower tier controllers 122 could be used to control different units in a process system (where each unit is associated with one or more machine-level controllers 114, controllers 106, sensors 102*a*, and actuators 102*b*).

Access to the lower tier controllers 122 may be provided by one or more operator stations 124. Each of the operator stations 124 includes any suitable structure for supporting user access and control of one or more components in the process system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 can represent any suitable communication network, such as an FTE network.

In the Purdue model, "Level 4" may include one or more upper tier controllers 130 (which may also be referred to as being plant-level controllers) that are coupled to the networks 128. As noted above, the upper tier controllers may also be at level 3.5 providing it access to both level 3 and level 4 networks. Each upper tier controller 130 is typically associated with one of the plants 101*a*-101*n*, which may include one or more process units that implement the same, similar, or different processes. The upper tier controllers 130 perform various functions to support the operation and control of components in the lower levels. As particular examples, the upper tier controller 130 can execute one or more manufacturing execution system (MES) applications, scheduling applications, production coordination, or other or additional plant or process control applications. A multivariable controller, similar to lower tier controller 122, may execute at this level to achieve plant-level control. Each of the upper tier controllers 130 includes any suitable structure for providing access to, control of, or operations related to one or more process units in a process plant. Each of the upper tier controllers 130 could, for example, represent a server computing device running a MICROSOFT WINDOWS operating system.

Access to the upper tier controllers 130 may be provided by one or more operator stations 132. Each of the operator stations 132 includes any suitable structure for supporting user access and control of one or more components in the process system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing to communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 does not include hardware in the same sense as at other levels, but represents the applications necessary for enterprise management, and is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications.

Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed/controlled, the functionality of the enterprise-level controller 138 can be incorporated into the upper tier controller 130.

Access to the enterprise-level controllers 138 may be provided by one or more operator stations 140. Each of the operator stations 140 includes any suitable structure for supporting user access and control of one or more components in the process system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the process system 100. For example, a data historian (historian) 141 can be coupled to the network 136. The historian 141 could represent a component that stores various information about the process system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the process system 100, or multiple historians could be distributed in different locations in the process system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

Over the past several decades, MPC has become the standard multivariable control solution for many industries. The widespread use of MPC has set a solid foundation for a more economically-significant advancement, namely closed-loop plantwide optimization. However, many technical, workflow, and user-experience challenges exist in attempting to provide closed-loop plantwide optimization for most industries. As a result, open-loop plantwide optimization, commonly known as production planning, is still performed. In practice, plantwide planning optimization is rarely if ever implemented as part of a closed-loop control system. In fact, in many industries, planning results are often manually (and hence non-optimally) adjusted through mediating instruments such as daily operator instruction sheets. Because of this, a significant amount of manufacturing profit remains unobtainable.

In some industries, a mediating solution layer, such as an open-loop production scheduler, has been devised to disaggregate a production plan into smaller executable pieces. This scheduler assists the translation of a planning solution into operator actions, but it does not eliminate manual adjustments. In other industries, an open-loop production scheduler has been used in place of production planning, but its output targets are often manually adjusted, as well.

The practice of manually adjusting an open-loop solution often stems from the need to translate or revise high-level production targets in order to (i) satisfy low-level (possibly safety-related) control constraints in the process units and (ii) compensate for disturbances to production inventories or product qualities (called "unplanned events" in planning terminology). The technical difficulties involved in manual translation, to a large extent, coincide with the difficulties involved in integrating multi-level solutions that use models at different scales.

This Disclosure provides a cascaded MPC solution for a control system that provides plantwide control and optimization, which helps to provide plantwide optimization as part of an automatic control and automation system. As described below, an upper tier MPC controller is configured to use a planning model, such as a single-period planning model or other suitable reduced model(s), as a seed model. The upper tier MPC controller performs plantwide business optimization using its optimizer to control production inventories, manufacturing activities, or product qualities inside a plant. The upper tier MPC controller is cascaded on top of one or more lower tier MPC controllers.

The lower tier MPC controllers could, for example, represent controllers at the unit level (Level 3) of a system, and each lower tier MPC controller provides the upper tier MPC controller (typically Level 4) with its operating states and constraints. Because of this, a plantwide optimization solution from the upper tier MPC controller can honor all unit-level operating constraints from the lower tier MPC controllers. Jointly, the MPC controllers cascade simultaneously provides both decentralized controls (such as at the process unit level) and centralized plantwide optimization (such as at the plant level) in a single consistent control system. The phrases "plantwide optimization" or "plantwide control" refers to optimization or control of multiple units in an industrial facility, regardless of whether those multiple units represent every single unit in the industrial facility.

In this way, this disclosed MPC cascade solution enables embedded real-time planning solutions to honor lower tier operating constraints. By cross-leveraging both planning and control models online, the disclosed MPC cascade solution makes it possible to run a "reduced-horizon" form of planning optimization within a closed-loop control system in real-time. Among other things, the disclosed MPC cascade solution can be used to automatically carry out just-in-time production plans through its lower tier MPC controllers. The formulation of the reduced-horizon planning optimization in the upper tier MPC controller could be similar or identical to that of a single-period planning optimization as used in offline planning tools but typically with its time-horizon shortened, such as between one and fourteen days.

The remaining description in this application is divided as follows. A multiscale model that can be used in industrial process control and automation settings is described, and an MPC cascade solution using the multiscale models is provided. A conduit for merging multiscale models in the form of a proxy limit is described, and a multiscale solution for improving a user's experience is provided.

Although FIG. 1 illustrates one example of an industrial process control and automation process system 100, various changes may be made to FIG. 1. For example, a process system could include any number of sensors, actuators, controllers, servers, operator stations, networks, and other components. Also, the makeup and arrangement of the process system 100 in FIG. 1 is for illustration only. Components could be added, omitted, combined, or placed in any other suitable configuration according to particular needs. Further, particular functions have been described as being performed by particular components of the process system 100. This is for illustration only. In general, control and automation systems are highly configurable and can be configured in any suitable manner according to particular needs. In addition, FIG. 1 illustrates an example environment in which an MPC cascade solution can be used. This functionality can be used in any other suitable device or system.

Figure 2:
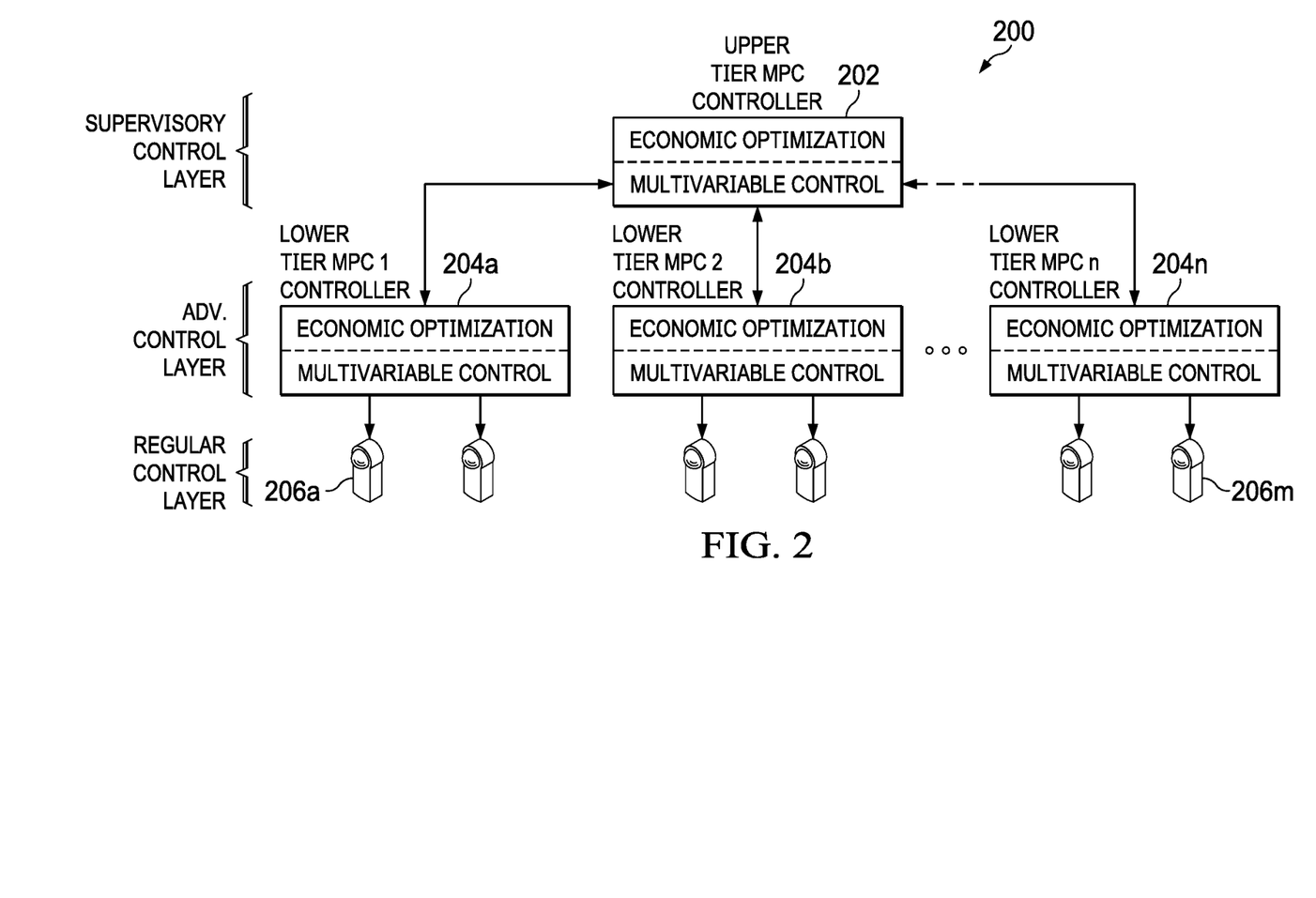

FIG. 2 illustrates an example cascaded MPC system 200 for a process system such as the process system 100 shown in FIG. 1. As shown in FIG. 2, the cascaded MPC system 200 includes an upper tier MPC controller 202 and at least one, and generally two or more lower tier MPC controllers shown as 204a-204n. The lower tier MPC controllers 204a-204n interact with one or more regular process controllers 206a-206m, which are associated with one or more processes run within a plant. The lower tier MPC controllers 204a-204n can denote Level 3 controllers, while the process controllers 206a-206m can denote Level 2 controllers.

A remainder of the IPF (or plant) can include Level 1 controllers, sensors, actuators, and other lower-level components. The upper tier MPC controller 202 generally operates within an upper tier control loop, while each lower tier MPC controllers 204a-204n generally operates within a lower tier control loop. There could be one or multiple lower tier control loops within a single upper tier control loop.

Each MPC controller 202, 204a-204n supports business optimization and multivariable control functions. The upper tier MPC controller 202 uses a planning model (such as a yield-based single-period planning model) to provide an initial steady-state gain matrix, and relevant model dynamics can be determined using operating data of the plant (such as historical data). The upper tier MPC controller 202 operates to control product inventories, manufacturing activities, or product qualities within the plant. The embedded business optimizer of the upper tier MPC controller 202, which is furnished with the same planning model structure and economics, can therefore reproduce the single-period offline planning optimization but in an online and real-time manner.

The upper tier MPC controller 202 shown cascading on top of a lower tier MPC controllers 204a-204n (n is an integer value greater than or equal to one). The lower tier MPC controllers 204a-204n provide the upper tier MPC controller 202 with future predictions and operating constraints for each process unit of a plant. With this information, a real-time planning solution from the cascaded architecture in the cascaded MPC system 200 reduces or eliminates the drawbacks described above. Jointly, the MPC controller 202, and MPC controllers 204a-204n provide simultaneously decentralized controls at lower tier with fine-scale MPC models and centralized plantwide optimization at upper tiers with a coarse-scale planning model, all in one consistent cascaded control system.

Another reason a production plan often needs to be manually converted into a set of operating instructions is that an open-loop planning solution has a time horizon that typically ranges from several days to a month (for a single period), and it is commonly executed only once a day or once every several days. Thus, it lacks an effective feedback mechanism to deal with uncertainties, such as changes in feed quality or in ambient conditions, process unit upsets, heating or cooling capacity limitations, and maintenances. In order to help deal with these situations, an optimizer is embedded in the upper tier MPC controller 202, where the optimizer can execute at a user-defined frequency, such as one ranging from once every several minutes to once an hour. Both production quantities and qualities of each unit can be measured or estimated at that frequency, and prediction errors can be bias-corrected in the upper tier MPC controller 202 as in any standard MPC. If any deviations from the original optimal plan are detected, a plantwide re-optimization can take place immediately. The new optimal production targets can then be sent to and get carried out by the lower tier MPC controllers 204a-204n, reducing or eliminating the need for manual translation or adjustment.

Certain optimization settings can also be modified from conventional MPC optimization settings in order to capture additional benefits in real-time. Some similarities and differences between the traditional MPC approach and the cascaded MPC solution could include the following:

The objective function can remain the same as in the offline planning counterpart. The time horizon in the upper tier MPC controller 202 can be an online tuning parameter, such as one ranging from several hours to several days or weeks, and it can be shorter than the time horizon used in offline (particularly multi-period) planning.

The tuning can be set to capture more benefits in the form of just-in-time manufacturing. Considerations for tuning may include (as examples) how far in advance product orders are placed, the variance of product orders (both in quantities and grades), what additional buy/sell opportunities can be pursued, and what semi-finished components can be exchanged with partners or bought/sold on the spot market.

Production inventories and product properties can be controlled dynamically with real-time measurement feedback. Product orders within the time horizon are known, as opposed to being estimated in the offline counterpart. The upper tier MPC controller 202 can produce a just-in-time production plan as opposed to a plan based on assumed orders.

The planning model used in the upper tier MPC controller 202 can be updated in real-time with a yield validation mechanism associated with the lower tier MPC controllers 204a-204n. After cross-validation (such as for metering errors), measured yields can be used to update the planning model, and the upper tier MPC controller 202 can generate a more accurate profitable production plan.

To achieve simultaneous optimization of both the upper tier MPC controller 202 and lower tier MPC controllers 204a-204n, information is communicated between these controllers. Specifically, the optimized target from the upper tier MPC controller 202 needs to be communicated to each of the lower tier MPC controllers 204a-204n. In return, the lower tier MPC controllers 204a-204n bound the key optimization parameters in the upper tier MPC controller 202.

While other methods exist for bounding the key optimization parameters, such as the cascaded MPC approach disclosed in U.S. Pat. Nos. 10,379,503 and 10,466,684 to Joseph Lu (Lu), a new cascaded MPC approach is described herein which unlike Lu is an iterative approach in which only the limiting constraints from a larger number of constraints which are determined by the lower tier controller to be actively limiting the approach to the global optimal are passed back from the lower tier MPC controllers 204a-204n to the upper tier MPC controller 202. These limiting constraints are represented as inequality equations involving the key optimization parameters. However, if the inequality constraint involves only one CMV, then the inequality constraint reduces to a refinement of the CMV bounds. In other words, CMV<10 is an inequality constraint, but it also limits the CMV to have an upper bound of 10.

Figure 3:
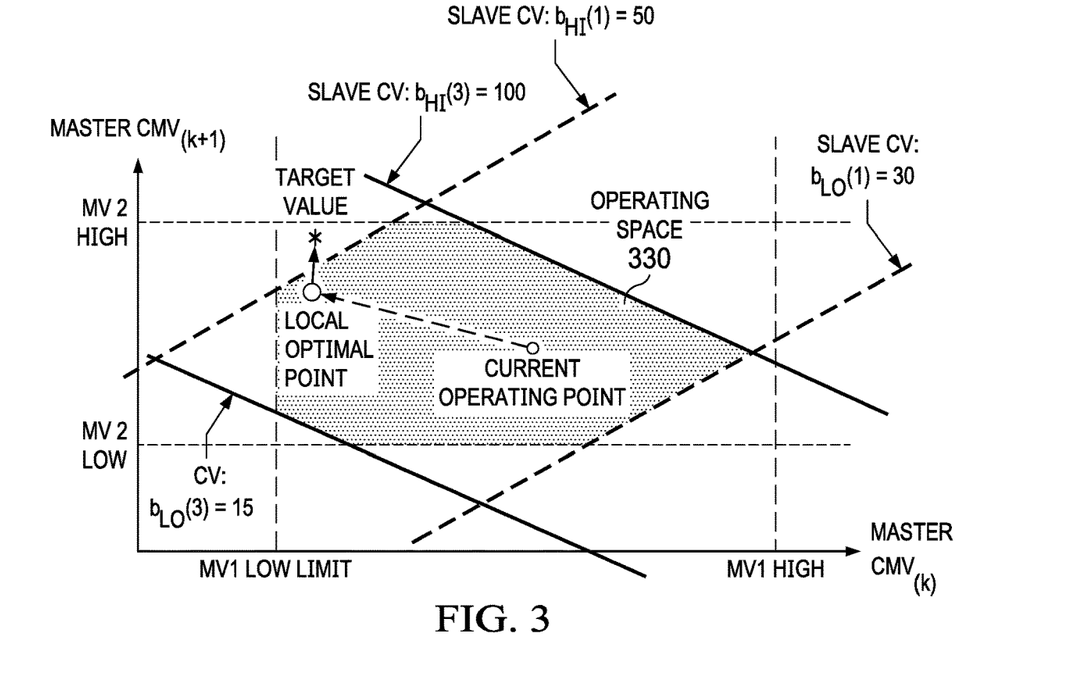
FIG. 3 is a plot of the feasible operating space for a lower tier controller having two conjoint manipulated variables ($CMV_{(k)}$ and $CMV_{(k+1)}$). In this plot, the lower tier controller wants to drive the CMVs to defined values as determined by the upper tier controller. These defined values are shown as the 'target' value in FIG. 3.

Turning now to FIG. 3, instead of using the current operating point as the focus from which bounds are derived for the CMVs, this approach uses the local optimal point instead. The optimal operating point when utilized is calculated by the lower tier MPC controller (or process unit controller shown as the lower tier controllers 204a-204n in FIG. 2 described above). By design, this optimal operating point for the CMV is the expected steady state operating point which is both feasible and optimal at the process unit level (being the level with the lower tier MPC controllers 204a-204n, Level 3). When coupled with the upper tier MPC controller 202, the lower tier MPC controller will try to drive the CMVs to defined values as determined by the upper tier MPC controller. These defined values are shown as the target value in FIG. 3.

The target value may or may not be feasible at the unit (lower tier) level. In other words, if left unchecked, the set of values for the CMVs may force the lower tier MPC controllers into an infeasible operating range. The local optimizer of the lower tier controller prevents this by utilizing only the "operating space" 330 shown in FIG. 3 which results in truncating the target value for the CMV to ensure feasibility of the local optimal point, shown in FIG. 3 as being truncated at a process limit shown as Slave CV: $b_{H1}(1)$.

A single optimization problem is constructed to drive the current optimal point of the CMV(s) toward the target value of the CMV(s) passed from the upper tier MPC controller to the lower tier controller. This new optimization problem includes all local operating constraints and can be a straight-line approach to the target value. The optimization process stops when either the optimal point matches the target value, or when the optimal point reaches an operating bound.

The result of the previous optimization is analyzed to determine which boundaries coincide with the solution. The coincident boundary information is passed back to the upper tier MPC controller where it is used to bound future values for the CMVs. This approach only returns information on those constraint(s) referred to herein as selected constraint(s) (e.g. the Slave CV: $b_{H1}(1)$ shown in FIG. 3) that are actively preventing movement toward the global optimal for the CMV (s), which can drastically reduce the amount of information conveyed from the lower tier MPC controller back to the upper tier MPC controller.

Figure 4:
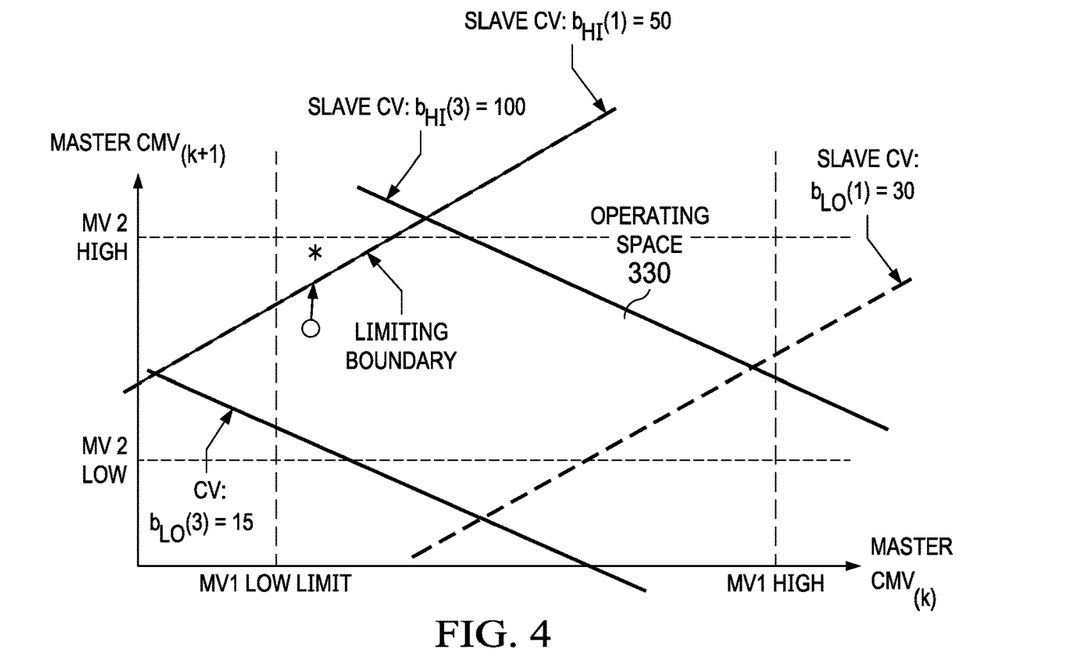
FIG. 4 shows a limiting boundary that prevents the lower tier controller from fully achieving the target value generated by the upper tier controller.
Figure 5:
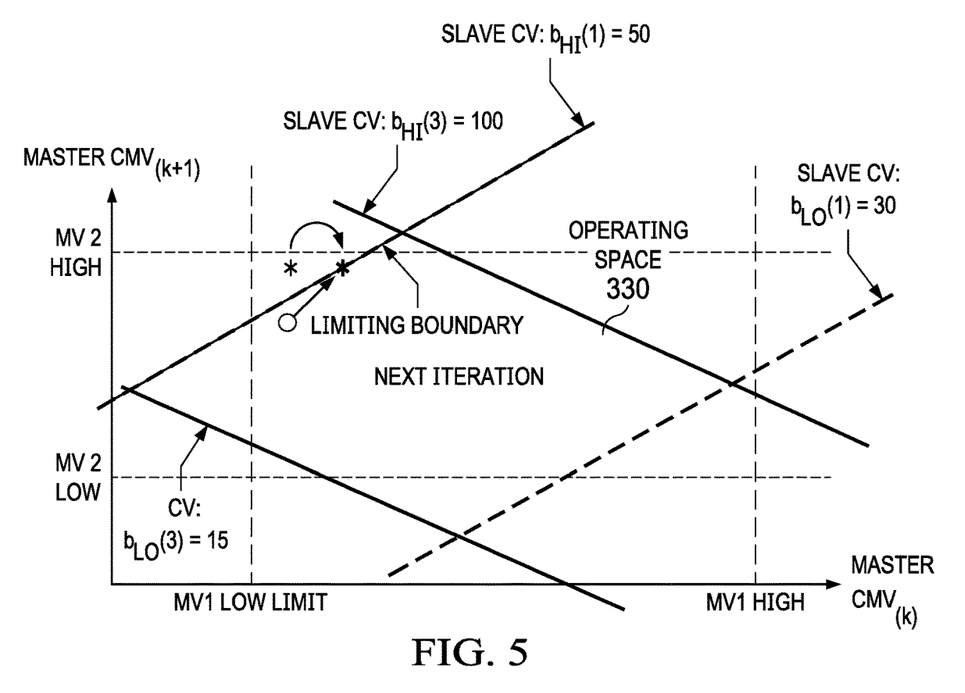
FIG. 5 shows results of the next iteration where the target value has moved to the limiting boundary and matches what can be achieved in the lower tier optimization. In this FIG. 5 both solutions lie on the limiting boundary.
Figure 6:
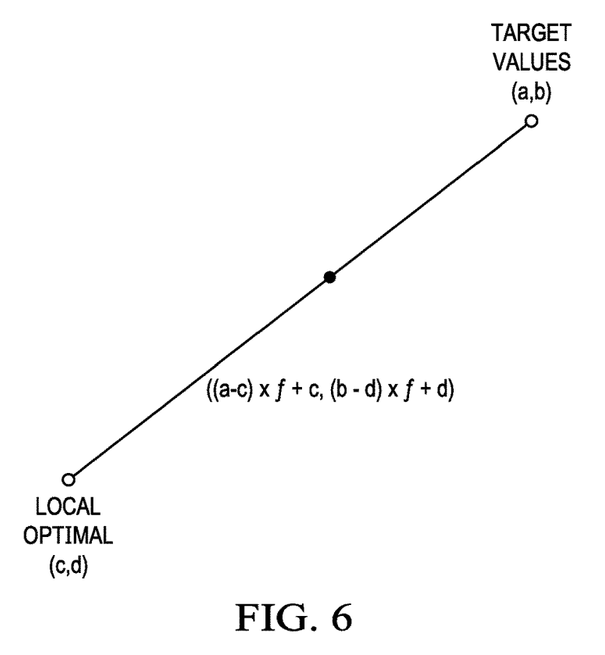
FIG. 6 depicts a straight-line path from the local optimum to the target operating point.

FIG. 4 shows a limiting boundary that prevents the lower tier controller from fully achieving the target value generated by the upper tier controller. FIG. 5 shows results of the next iteration where the target value has moved to the limiting boundary and matches what can be achieved in the lower tier optimization. In FIG. 5, both solutions lie on the limiting boundary. FIG. 6 depicts a straight-line path from the local optimum to the target value.

Figure 7:
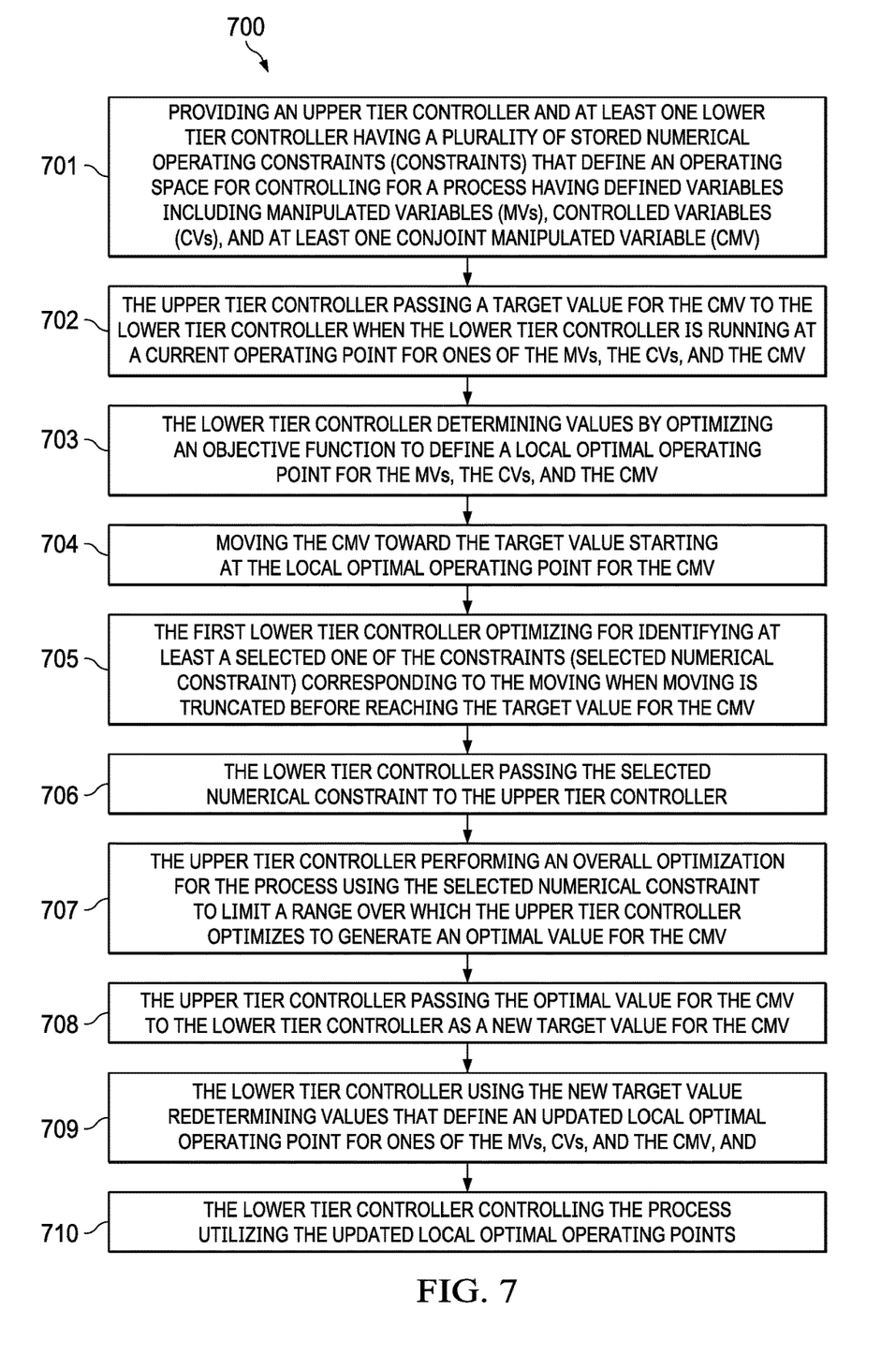
FIG. 7 is a flow chart that shows steps in a method of cascaded MPC with abstracting constraint boundaries, according to an example aspect.

FIG. 7 is a flow chart that shows steps in a method 700 of cascaded MPC with abstracting constraint boundaries, according to an example aspect. The method 700 is generally applied to a process (e.g. an oil refining process) involving a tangible material run in an industrial processing facility (IPF), also known as a plant.

Step 701 comprises providing an upper tier controller and at least one lower tier controller having a plurality of stored numerical operating constraints (constraints) that define an operating space for controlling a process having defined variables including MVs, CVs, and at least CMV. There are generally multiple CMVs. The CMV(s) can be either a MV or a CV.

Step 702 comprises the upper tier controller passes a target value for the CMV to the lower tier controller when the lower tier controller is running at a current operating point for ones of the MVs, the CVs, and the CMV. In the case of multiple CMVs, the respective CMVs are generally dedicated to specific lower tier controllers, where each lower tier controller can handle 1 or more of the CMVs. Step 704 comprises the lower tier controller moving the CMV towards the target value for CMV starting at the current operating point for the CMV. In the case of multiple CMVs, each lower tier controller moves the CMVs they are responsible towards the target value for CMV(s). Optionally, as noted above, before the moving (step 704), the lower tier controller in step 703 can determine values by optimizing an objective function to define a local optimal operating point for the MVs, the CVs, and for the CMV, wherein the moving instead of starting at the current operating point for the CMV can comprise starting at the local optimum operating point for the CMV.

Step 705 comprises the lower tier controller optimizing for identifying at least a selected one of the constraints (selected numerical constraint) corresponding to the moving when moving is truncated before reaching the target value for the CMV. When one constructs the selected constraint optimization problem there are numerous constraints the define the operating space for the process unit. One is only interested in those numerical constraints that prevent one from proceeding further. As a simple example, assume the constraint comprises CMV1 must be more than 5 and less than 10, so that two constraints regarding CMV1 are defined. In FIGS. 3 to 5, these constraints would be either the vertical or horizontal lines shown. If the target value is 11, then CMV1 would be limited to CMV1<10. There is no need to also return the constraint CMV1>5 to upper tier controller because in this case the constraint is not limiting the ability to approach the target value of 11. CMV1 which must be less than 10 in this example that does interfere with the ability to reach the target value of 11, so this numerical constraint would be passed back to the upper tier controller as a selected numerical constraint.

Step 706 comprises the lower tier controller passing the selected numerical constraint(s) to the upper tier controller. Step 707 comprises the upper tier controller performing an overall business optimization for the process using the selected numerical constraint to limit a range over which the upper tier controller optimizes to generate an optimal value for the CMV. Step 708 comprises the upper tier controller passing the optimal value to the lower tier controller as a new target value for the CMV. Step 709 comprises the lower tier controller using the new target value for the CMV for redetermining values that define updated operating points for ones of the MVs, and CVs, and optionally for the CMV. Step 710 comprises the lower tier controller controlling the process utilizing the updated operating points.

The lower tier controller(s) can thus be configured for calculating a local optimal operating point which is where the expected steady-state operating point for the CMV that is both feasible and optimal at the lower tier controller level, and also limiting constraints for the CMV. Typically, the limiting constraints are inequality equations involving the CMVs. These inequality constraints sometimes can be reduced to an upper bound and a lower bound on a CMV. However, in other cases, one needs to pass the complete inequality constraint to the upper tier controller, expressed as gain value for each CMV and at least one bounding value. As an example, if the operating constraint inequality involving two CMVs is $2CMV_1 - 3CMV_2 < 10$, one can pass the two gain coefficient values, in this example being 2 and 3 along, with the bounding value of 10 from the lower tier controller to the upper tier controller.

The moving the CMV can stop when either the local optimal operating point matches the target operating point, or when the moving of the local optimal operating point results in reaching an upper bound or a lower bound of a constraint. Because the lower tier controller needs to remain feasible, any progress toward the target value will be stopped if there is a limitation imposed by a limiting constraint in the lower tier controller. The moving can comprise a straight-line movement to the target value. Although non-straight paths can also be used, a straight-line path is a simpler method to implement.

The limiting constraints can comprise inequality constraints that reduce to an upper bound and a lower bound for the CMV, where the method can further comprise analyzing results of a previous optimization to determine which of the upper bound and the lower bound coincide with the operating point result to provide coincident boundary information. The method can then comprise passing back the coincident boundary information from the lower tier controller to the upper tier controller, wherein the upper tier controller uses the coincident boundary information to bound future values for the target value for the CMV.

The limiting constraints can comprise inequality constraints that reduce to an upper bound and a lower bound for the CMV, and the method can further comprise determining the upper bound and the lower bound by finding an initial upper bound and an initial lower bound and using a series of optimization problems. These bounds may or may not be later refined. These bounds, along with any other bounds determined, are generally passed to the upper tier controller. As noted above, the selected constraints can include an inequality constraint expressed as gain value and at least one (generally both an upper and a lower) bounding value.

Examples

Disclosed embodiments are further illustrated by the following specific Examples, which should not be construed as limiting the scope or content of this Disclosure in any way.

Example calculation details are now described. Both the upper tier controller and lower tier controller(s) participate in this scheme. The following description describes the implementation of this scheme inside a Honeywell International PROFIT EXECUTIVE, keeping in mind this scheme can be implemented inside other similar process control products.

For the PROFIT EXECUTIVE, the lower tier MPC (process unit level) controller is called the secondary controller, and the upper tier MPC controller is called the primary controller. The secondary controller is responsible for the generation of proxy limits, and the bounds applied to the CMVs. Additional constraint calculations can be added to this code. To calculate proxy limits, one first determines the upper and lower bounds for each of the CMVs. The "full" range is utilized meaning all remaining CMVs can move within bounds while one maximizes or minimizes the remaining CMVs. This optimization can be summarized as:

$$\min_{MV} Conj_k \text{ and } \max_{MV} Conj_k$$

subject to $$MV_L \leq MV \leq MV_H$$

$$CV_L \leq CV \leq CV_H$$

It is noted that the bounds computed above may lead to infeasible operation if additional constraints are not added. Before calculating the additional constraints, one generally needs to ensure each of the CMVs are an independent variable. By design, this is true of the primary controller, but when shared with the secondary controller, the CMVs may appear as either MVs or CVs in the secondary controller. To ensure consistency, a change in basis can be performed using the state gain matrix, G, to relate changes in the MV's to changes in the CVs:

$$\begin{bmatrix} MV \\ CV \end{bmatrix} = \begin{bmatrix} I \\ G \end{bmatrix} \times MV$$

where j represents the rows of I corresponding to MVs and k the rows of G corresponding to the CVs.

Using singular value decomposition, $T=USV^T$. With this mapping, V maps the MV space and is a square matrix with size equal to number of MVs. U maps the conjoint variable space and is a square matrix with size equal to number of conjoint variable. S is diagonal matrix relating input to output mappings.

To complete the change in basis, one needs to include non-conjoint variables to fully map the MV space. Because these non-conjoint variables do not need to match real variables, one can choose a set of orthogonal variables that are also orthogonal to the conjoint space. To do this, the identity matrix is appended to both U and S to create three square matrices with size equal to number of MVs:

$$\hat{U} = \begin{bmatrix} U & 0 \\ 0 & I \end{bmatrix}$$

$$\hat{S} = \begin{bmatrix} S & 0 \\ 0 & I \end{bmatrix}$$

this results in:

$$\begin{bmatrix} ConjMV \\ ConjCV \\ NonConj \end{bmatrix} = \hat{U}\hat{S}V^T \times MV$$

with a pseudo-inverse of:

$$MV = V\hat{S}^{-1}\hat{U}^T \times \begin{bmatrix} ConjMV \\ ConjCV \\ NonConj \end{bmatrix}$$

To complete the change in basis, one can rewrite the original operating variables in terms of the CVs:

$$\begin{bmatrix} MV \\ CV \end{bmatrix} = \begin{bmatrix} I \\ G \end{bmatrix} \times MV$$

to:

$$\begin{bmatrix} MV \\ CV \end{bmatrix} = \begin{bmatrix} I \\ G \end{bmatrix} \times V\hat{S}^{-1}\hat{U}^T \times \begin{bmatrix} ConjMV \\ ConjCV \\ NonConj \end{bmatrix}$$

With the change of basis complete, a new optimization is disclosed where one maximizes the distance to the target value provided by primary controller. During this optimization, a straight-line path from the local optimal to the target is followed. Consider the following graph shown in FIG. 6 which shows a straight-line path from the local optimum to the target.

f is a single parameter where every point along the line segment can be defined as having the coordinates ((a–c)× f+c, (b–d)×f+d). Now, define $\delta_i$ as the difference between target and the local optimal for variable i and set the local optimal at the origin, (0,0). All the points along the line segment have coordinates of ($\delta_1 f, \delta_2 f$). Algebraically, this leads to:

$$ConjMV_i = \delta_i \times f$$

$$ConjCV_j = \delta_j \times f$$

where i represents the conjoint MVs, and j represents the conjoint CVs. Appending f to the independent variable set, one can write the following set of equality equations:

$$\begin{bmatrix} -1 & 0 & 0 & \delta_i \\ 0 & -1 & 0 & \delta_j \end{bmatrix} \begin{bmatrix} ConjMV \\ ConjCV \\ NonConj \\ f \end{bmatrix} = 0$$

Using above relationships, one can define any optimization problem, whereby one can maximize the distance to the target value.

Once f is maximized:

$$\max_{Conj} f$$

such that:

$$MV_L \leq V\hat{S}^{-1}\hat{U}^T \times \begin{bmatrix} ConjMV \\ ConjCV \\ NonConj \end{bmatrix} \leq MV_H$$

$$CV_L \leq G V\hat{S}^{-1}\hat{U}^T \times \begin{bmatrix} ConjMV \\ ConjCV \\ NonConj \end{bmatrix} \leq CV_H$$

$$0 \leq f \leq 1$$

$$\begin{bmatrix} -1 & 0 & 0 & \delta_i \\ 0 & -1 & 0 & \delta_j \end{bmatrix} \begin{bmatrix} ConjMV \\ ConjCV \\ NonConj \\ f \end{bmatrix} = 0$$

Once f is maximized, one can analyze the result for which MV and CV inequality constraints are against their limits. To avoid oscillations in the constraint sets, a liberal threshold is applied to this test. While some of the resulting constraints may not be mathematically active, they are relatively close. The resulting constraints are further classified and treated differently.

Regarding the case of non-conjoint only, if the constraint involves non-conjoint variables only, that is, it is of the form:

$$LB \leq [0 \ 0 \ X \ 0] \begin{bmatrix} ConjMV \\ ConjCV \\ NonConj \\ f \end{bmatrix} \leq UB$$

then the constraint is ignored. The primary controller has no direct influence on non-conjoint variables.

Regarding the case of one variable only, if the constraint involves only one conjoint variable, the constraint is transferred to a limitation on the conjoint variable bounds. For example, consider a constraint involving only the first conjoint MV:

$$LB \leq [a \ 0 \ 0 \ X \ 0] \begin{bmatrix} ConjMV_1 \\ ConjMV_{i \neq 1} \\ ConjCV \\ NonConj \\ f \end{bmatrix} \leq UB$$

Alternatively, this can be written as:

$$LB \leq a \times ConjMV_1 + X \times NonConj \leq UB$$

so:

$$\frac{LB - X \times NonConj}{a} \leq ConjMV_1 \leq \frac{UB - X \times NonConj}{a}$$

Regarding multivariable constraints, lastly are constraints involving more than one CMV. For these constraints, the upper tier controller can trade-off moves in one conjoint variable by adjusting the other. Consequently, the whole constraint bound should be passed back to the upper tier MPC controller. These constraints can be written:

$$LB \leq [X \ Y \ Z \ 0] \begin{bmatrix} ConjMV \\ ConjCV \\ NonConj \\ f \end{bmatrix} \leq UB$$

or:

$$LB - Z \times NonConj \leq X \times ConjMV + Y \times ConjCV \leq UB - Z \times NonConj$$

The bound correction term, Z×NonConj, is calculated and applied to the bounds before the constraints are conveyed to the primary controller. The secondary controller transmits the conjoint variable gains for active constraints along with the upper and lower bounds.

Regarding the primary controller, the primary controller uses enhanced proxy limits, including the additional constraints transmitted from the secondary controller, to limit the operating space over which it optimizes. The PROFIT CONTROLLER's optimization code is altered to include the additional constraints. The revised primary controller is:

$$\min_x (x^T H x - J x)$$

subject to:

$$MV_L \leq x \leq MV_H$$

$$CV_L \leq Gx \leq CV_H$$

$$LB \leq Cx \leq UB$$

where x are the manipulated variables, H is the Hessian matrix, J is the Jacobian matrix, G is the steady state gain matrix for the primary controller, C is the gain matrix passed as an additional constraint from the secondary controller, and $MV_L/MV_H/CV_L/CV_H/LB/UB$ are bounds with LB/UB associated with the additional constraints. The Hessian and Jacobian matrices are functions of the quadratic and linear weights, and are independent of the additional constraint terms.

Disclosed aspects can be applied generally to any optimization problem, one particular application being to MPC. In the case of MPC, disclosed embodiments can be applied to conventional process facilities as well as other MPC applications including nonlinear plants, hybrid plants having a combination of dynamics and discrete mode change, engine control and large-scale operation control problems including operations management and campaign control.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of cascaded model predictive control (MPC), comprising:
    providing an upper tier controller and at least one lower tier controller, wherein the at least one lower tier controller is configured to store a plurality of numerical operating constraints that define an operating space for controlling a process and a plurality of variables that comprise: manipulated variables (MVs), controlled variables (CVs), and at least one conjoint manipulated variable (CMV);
    passing, by the upper tier controller, a target value for the at least one CMV to the at least one lower tier controller when the at least one lower tier controller is operating at a current operating point;
    calculating, by the at least one lower tier controller, a local optimal operating point for the at least one CMV, wherein the local optimal operating point is indicative of a steady state operating point for the at least one CMV;
    moving, by the at least one lower tier controller, the at least one CMV towards the target value starting at the local optimal operating point for the at least one CMV;
    identifying, by the at least one lower tier controller, at least one of the numerical operating constraints as a limiting constraint, wherein the limiting constraint limits the movement of the local optimal operating point towards the target value;
    passing, by the at least one lower tier controller, the limiting constraint to the upper tier controller;
    performing, by the upper tier controller, an optimization for the process using the limiting constraint to generate an optimal value for the at least one CMV, and
    passing, by the upper tier controller, the optimal value for the at least one CMV to the lower tier controller as a new target value for the at least one CMV;
    using, by the lower tier controller, the new target value to generate updated operating points for at least one of the MVs and CVs; and
    controlling, by the at least one lower tier controller, the process utilizing the updated operating points.

2. The method of claim 1, further comprising stopping the movement of the at least one CMV towards the target value when the local optimal operating point for the at least one CMV matches the target value.

3. The method of claim 1, wherein the optimization for the process comprises: optimizing an objective function for a straight-line movement from the local optimal operating point of the at least one CMV toward the target value for the at least one CMV.

4. The method of claim 1, wherein the calculating, by the at least one lower tier controller, the local optimal operating point for the at least one CMV, comprises determining if the local optimal operating point is feasible and optimal for the at least one lower tier controller.

5. The method of claim 1, further comprising stopping the movement of the at least one CMV towards the target value when the local optimal operating point for the at least one CMV reaches an upper bound or a lower bound of the limiting constraint.

6. The method of claim 1, further comprising identifying, by the at least one lower tier controller, at least one of the numerical operating constraints as a non-limiting constraint.

7. The method of claim 1, further comprising:
    analyzing, by the at least one lower tier controller, results of the optimization to determine an upper bound value and a lower bound value of the operating space;
    sending, by the at least one lower tier controller to the upper tier controller, the upper bound value and the lower bound value of the operating space;
    determining, by the upper tier controller, a future target value for the at least one CMV.

8. The method of claim 1, further comprising:
    expressing the limiting constraint as a gain value and at least one bounding value.

9. A cascaded model predictive control (MPC) system, comprising:
    an upper tier controller and at least one lower tier controller, wherein the at least one lower tier controller is configured to store a plurality of numerical operating constraints that define an operating space to control a process and a plurality of variables that comprise: manipulated variables (MVs), controlled variables (CVs), and at least one conjoint manipulated variable (CMV),
    wherein the upper tier controller is configured to pass a target value for the at least one CMV to the lower tier controller when the at least one lower tier controller is operating at a current operating point,
    wherein the lower tier controller is configured to:
        calculate a local optimal operating point for the at least one CMV, wherein the local optimal operating point is indicative of a steady state operating point for the at least one CMV;
        move the at least one CMV towards the target value starting at the local optimal operating point for the at least one CMV;
        identify at least one of the numerical operating constraints as a limiting constraint, wherein the limiting constraint limits the movement of the local optimal operating point towards the target value; and
        pass the limiting constraint to the upper tier controller;
    the upper tier controller configured to:
        perform an optimization for the process using the limiting constraint to generate an optimal value for the at least one CMV; and
        pass the optimal value for the at least one CMV to the lower tier controller as a new target value for the at least one CMV; and
    the lower tier controller further configured to:
        use the new target value to generate updated operating points for at least one of the MVs and CVs; and
        control the process utilizing the updated operating points.

10. The cascaded MPC system of claim 9, wherein the movement corresponds to a straight-line path toward the target value for the at least one CMV.

11. The cascaded MPC system of claim 9, wherein the limiting constraint comprises an inequality constraint that reduces to an upper bound and a lower bound for the at least one CMV.

12. The cascaded MPC system of claim 9, wherein the process corresponds to a tangible material run in an industrial processing facility (IPF).

13. The cascaded MPC system of claim 9, wherein the movement of the at least one CMV stops when the local optimal operating point for the at least one CMV matches the target value for the at least one CMV.

14. The cascaded MPC system of claim 9, wherein the movement of the at least one CMV stops when the local optimal operating point reaches an upper bound or a lower bound of the limiting constraint.

15. The cascaded MPC system of claim 9, wherein the at least one lower tier controller is configured to calculate the local optimal operating point for the at least one CMV if the local optimal operating point is feasible and optimal for the at least one lower tier controller.

16. The cascaded MPC system of claim 9, wherein the at least one lower tier controller is configured to identify at least one of the numerical operating constraints as a non-limiting constraint.

17. The cascaded MPC system of claim 9, wherein the at least one lower tier controller is configured to:
  analyze results of the optimization to determine an upper bound value and a lower bound value of the operating space;
  send the upper bound value and the lower bound value of the operating space to the upper tier controller.

18. The cascaded MPC system of claim 17, wherein the upper tier controller is configured to:
  determine a future target value for the at least one CMV based on the upper bound value and the lower bound value of the operating space.

19. The cascaded MPC system of claim 9, wherein the limiting constraint is expressed as a gain value and at least one bounding value.

* * * * *